United States Patent [19]
Hanson

[11] Patent Number: 6,035,025
[45] Date of Patent: Mar. 7, 2000

[54] SYSTEM AND METHOD FOR A PREPAID BUNDLED TELECOMMUNICATIONS ACCOUNT

[75] Inventor: Daniel A. Hanson, Dallas, Tex.

[73] Assignee: National Telemanagement Corporation, Dallas, Tex.

[21] Appl. No.: 09/004,054

[22] Filed: Jan. 7, 1998

[51] Int. Cl.[7] .................................................. H04M 15/00
[52] U.S. Cl. .......................... 379/144; 379/230; 379/114
[58] Field of Search ................................... 379/112, 114, 379/115, 121, 127, 144, 250

[56] References Cited

U.S. PATENT DOCUMENTS

| | | | |
|---|---|---|---|
| 4,706,275 | 11/1987 | Kamil | 379/144 |
| 4,930,150 | 5/1990 | Katz | 379/93 |
| 5,220,593 | 6/1993 | Zicker et al. | 379/59 |
| 5,291,543 | 3/1994 | Freese et al. | 379/59 |
| 5,345,498 | 9/1994 | Mauger | 379/58 |
| 5,353,335 | 10/1994 | D'Urso et al. | 379/144 |
| 5,412,726 | 5/1995 | Nevoux et al. | 380/24 |
| 5,438,615 | 8/1995 | Moen | 379/144 |
| 5,440,108 | 8/1995 | Tran et al. | 235/381 |
| 5,440,621 | 8/1995 | Castro | 379/112 |
| 5,450,938 | 9/1995 | Rademacher | 194/206 |
| 5,500,514 | 3/1996 | Veeneman et al. | 235/381 |
| 5,546,446 | 8/1996 | Tsunokawa et al. | 379/144 |
| 5,577,100 | 11/1996 | McGregor et al. | 379/58 |
| 5,577,109 | 11/1996 | Stimson et al. | 379/112 |
| 5,583,918 | 12/1996 | Nakagawa | 379/61 |
| 5,592,535 | 1/1997 | Klotz | 379/58 |
| 5,621,787 | 4/1997 | McKoy et al. | 379/144 |
| 5,621,796 | 4/1997 | Davis et al. | 380/24 |
| 5,719,926 | 2/1998 | Hill | 379/144 |
| 5,721,768 | 2/1998 | Stimson et al. | 379/114 |
| 5,722,067 | 2/1998 | Fougnies et al. | 455/406 |
| 5,732,136 | 3/1998 | Murphree et al. | 380/24 |
| 5,778,313 | 7/1998 | Fougnies | 455/406 |
| 5,826,185 | 10/1998 | Wise et al. | 455/406 |
| 5,850,599 | 12/1998 | Seiderman | 455/406 |
| 5,854,975 | 12/1998 | Fougnies et al. | 455/406 |

FOREIGN PATENT DOCUMENTS

| | | |
|---|---|---|
| 0 698 987 A2 | 2/1996 | European Pat. Off. . |
| 44 19 651 A1 | 12/1995 | Germany . |
| WO 95/28062 | 10/1995 | WIPO . |
| WO 95/34161 | 12/1995 | WIPO . |
| WO 96/15633 | 5/1996 | WIPO . |
| WO 96/36192 | 11/1996 | WIPO . |

OTHER PUBLICATIONS

Luna, Lynnette, "National Telemanagement answers prepaid wireless dilemmas", *RCR The Weekly Newspaper for the Wireless Industry*, pp. 30–36 Dec. 16, 1996.

"Automatic Prepaid Roaming Using the NTC Network", released by National Telemanagement Corporation, Jan. 1997.

"Other prepaid billing systems could match our. But they'd have to clone our number", Advertisement released by Subscriber Computer, Inc.

Freeman, Susan, "Are prepaid applications "on the fringe" or infringing?", Intele–Card News, pp. 32–36, Jan.Feb. 1996.

*Primary Examiner*—Paul Loomis
*Attorney, Agent, or Firm*—Baker Botts L.L.P.

[57] ABSTRACT

A method for prepaid bundled telecommunications services includes the steps of recognizing a prepaid account access call at a telecommunications carrier switch, and routing the prepaid account access call to a prepay call management platform coupled to the telecommunications carrier switch. An account number and an optional personal identification number associated with a prepaid bundled telecommunications service account are collected and verified. A destination number is then collected. An account balance associated with the prepaid bundled telecommunications service account is obtained from a database, and a method of computing charges associated with terminating the call to the collected destination number is determined. Next, whether the prepaid account contained sufficient funds to pay for the call is determined. The call is released to the telecommunications carrier switch for line termination, and the call is monitored for call completion. The charges associated with the call are then posted to the prepaid account.

25 Claims, 4 Drawing Sheets

SYSTEM AND METHOD FOR A PREPAID BUNDLED TELECOMMUNICATIONS ACCOUNT

RELATED PATENT APPLICATIONS

This patent application is related to pending U.S. patent application Ser. No. 08/897,507, entitled Prepay Telecommunications System With Unregistered Roaming Call Processing, filed on Jul. 21, 1997, which is a continuation-in-part application of pending U.S. patent application Ser. No. 08/794,463, entitled Prepay Telecommunications System filed Feb. 4, 1997. Both patent applications are incorporated herein by reference.

TECHNICAL FIELD OF THE INVENTION

This invention is related in general to the field of telecommunications. More particularly, the invention is related to a system and method for a prepaid bundled telecommunications account.

BACKGROUND OF THE INVENTION

The world of wireless telecommunications is entering a new era with the advent of personal communications services (PCS). The constant trend toward lower and lower subscriber acquisition costs and higher market penetration is creating a demand for more effective ways to offer the wireless service to broader segments of the population. However, a large percentage of applicants are normally turned away from wireless carriers due to poor or insufficient credit, although many of these applicants do possess the ability to pay for the service. Accordingly, a growing segment within the wireless telecommunications market is the prepaid wireless service.

Additionally, there is also growing popularity associated with telephone cards, which allows the card holder to make local telephone calls from public telephone facilities, and tolled or long distance calls from public and private facilities. Each telephone card has recorded thereon a predetermined amount of funds which can be applied toward telephone charges associated with the local and long distance calls. The charges are deducted from the telephone card until all funds are depleted.

Therefore, a consumer may have, in his/her possession, a number of telephone and prepaid wireless cards as well as credit and debit cards. The proliferation of these plastic cards and the associated account numbers not only encumbers the wallet, but also the mind. The sheer number of these cards also makes them easier to misplace and lose track of.

SUMMARY OF THE INVENTION

Accordingly, there is a need for a system and method for a prepaid bundled telecommunications account that allows the account holder to pay for telecommunications service access with funds from a single prepaid account balance.

In an aspect of the invention, a method for prepaid bundled telecommunications services includes the steps of recognizing a prepaid account access call at a telecommunications carrier switch, and routing the prepaid account access call to a prepay call management platform coupled to the telecommunications carrier switch. An account number and an optional personal identification number associated with a prepaid bundled telecommunications service account are collected and verified. A destination number is then collected. An account balance associated with the prepaid bundled telecommunications service account is obtained from a database, and a method of computing charges associated with terminating the call to the collected destination number is determined. Next, whether the prepaid account contained sufficient funds to pay for the call is determined. The call is released to the telecommunications carrier switch for line termination, and the call is monitored for call completion. The charges associated with the call are then posted to the prepaid account.

BRIEF DESCRIPTION OF THE DRAWINGS

For a better understanding of the present invention, reference may be made to the accompanying drawings, in which.

DETAILED DESCRIPTION OF THE INVENTION

Figure 1:
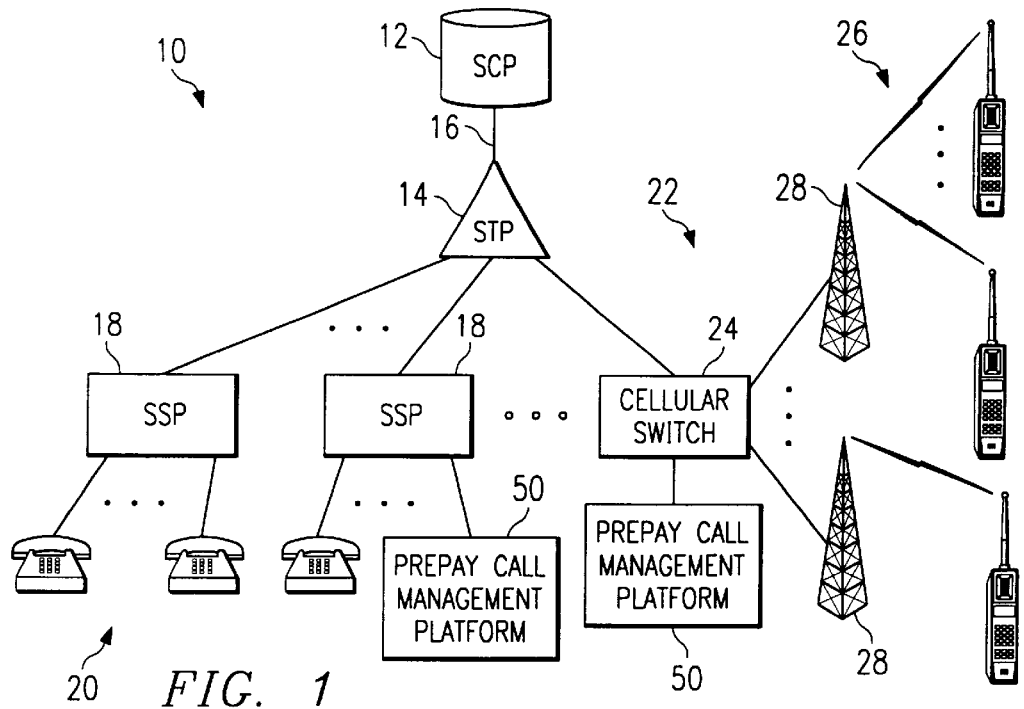
FIG. 1 is a block diagram of an exemplary telecommunications network according to the teachings of the present invention.

The preferred embodiments of the present invention are illustrated in FIGS. 1–5, like reference numerals being used to refer to like and corresponding parts of the various drawings.

Referring to FIG. 1, a block diagram of an exemplary telecommunications network 10 according to the teachings of the present invention is shown. Telecommunications network 10 is preferably constructed pursuant to the Advanced Intelligent Network (AIN) architecture 10. Telecommunications network 10 includes a service control point (SCP) 12 coupled to a signal transfer point (STP) 14 through a signaling system no. 7 (SS7) link set 16 specified by the Consultative Committee on International Telephone and Telegraph (CCITT). An SS7 link set may include up to sixteen 56 Kb/s links. STP 14 is in turn coupled to one or more service switching points (SSP) 18 also via SS7 link sets. SSPs 18 connect telephone service customers 20 to the telecommunications network. A prepay call management platform 50 may also be coupled to and co-located with SSP 18 to provide prepay live call management to wired telecommunications systems.

A wireless telephone system 22 is further coupled to STP 14 to provide wireless telecommunications services to wireless service customers 26. Wireless telephone system 22 may include a wireless or cellular switch residing in a mobile telecommunications switching office (MTSO) 24. Wireless telephone system 22 encompassing one or more MTSO 24 may include a number of land-based transmission towers 28 and/or satellite-based wireless transponders (not shown). Calls may originate from a non-wireless telephone customer 20 to another non-wireless telephone customer 20, from a wireless telephone customer 26 to another wireless telephone customer 26, from a non-wireless telephone customer 20 to a wireless telephone customer 26, and vice versa. According to the teachings of the present invention, a prepay call management platform 50 is coupled to cellular switch 24 to provide live call management therefor. Preferably, prepay call management platform 50 is co-located with cellular switch 24 or located on-site with cellular switch 24. The communications span between cellular switch 24 and prepay call management platform 50 may be a T1 line, an SS7 link set, or any other suitable medium according to any other suitable communications protocol.

Figure 2:
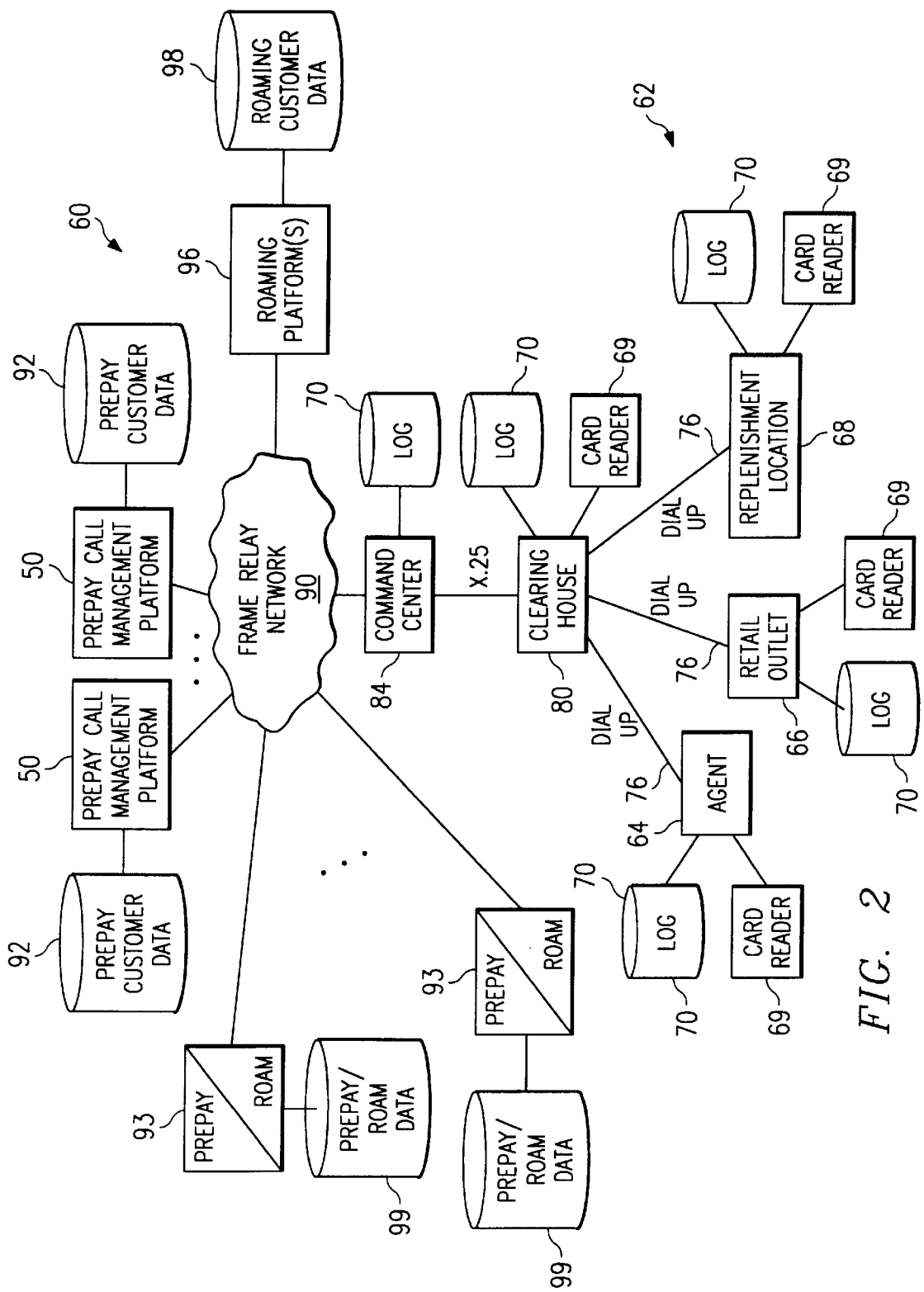
FIG. 2 is a block diagram of an exemplary prepay wireless telecommunications architecture according to the teachings of the present invention.

FIG. 2 is a block diagram of an exemplary prepaid bundled telecommunications services architecture 60 according to the teachings of the present invention. A number of customer interface facilities 62, such as authorized sales agents 64, retail outlets 66, and replenishing locations 68 are employed to provide a network of convenient access points to the customers. Card readers 69 may be employed at customer interface facilities 62 to read customer data stored in a deposit card issued to each prepay customer. A log 70 of customer information is kept at each respective customer interface facility 62 to record the customer names, account numbers, and the transaction amounts. The customers may activate prepaid bundled telecommunications services and replenish their accounts at any of these customer interface facilities 62. Further, customer interface facilities 62 may also include a clearinghouse network 80 which includes a large number of nationwide or global retail locations, such as the Travelers Express™, that may also be used to replenish prepaid bundled telecommunications services accounts. Clearinghouse 80 may further maintain a log 70 of its customer information. Authorized sales agents 64, retail outlets 66, and replenishing locations 68 may have dial-up connections to clearinghouse network 80, which may be coupled to a command center 84 through a packet switching X.25 span specified by the CCITT, for example.

Clearinghouse 80 may further be coupled to an optional command center 84 via an X.25 link, for example. Command center 84 may serve to oversee the operations of the prepaid bundled telecommunications telecommunications service system and as an interface between customer interface units 62 and clearinghouse 80 to prepay call management platforms 50. A log 70 of customer information may also be maintained at command center 84.

Command center 84 preferably communicates with one or more prepay call management platforms 50 via a frame relay network or wide area network 90. Each prepay call management platform 50 maintains a database 92 of its customers. Prepay call management platforms 50 may further communicate with one another and to one or more roaming platforms 96 via frame relay network 90. Each roaming platform 96 preferably maintains a roaming customer database 98. At other sites or cities, co-located prepay and roam wireless platforms 93 may serve the local wireless subscriber community. Databases 99 storing customer data related to prepay accounts and roaming capabilities are coupled to each prepay/roam platform 93. Prepay/roam platforms 93 may communicate with one another and with prepay wireless platforms 50 and roaming platforms 96 via frame relay network 90. As each customer activates a prepay account, he/she is assigned a primary or home prepay call management platform 50, where data associated with the customer's prepay account is stored.

In operation, cash, bank drafts, credit cards, and telephone company billing may be used to replenish the prepaid bundled telecommunications services account at any customer interface facility 62. A deposit card (not shown) which has a magnetic strip, embedded chip, or another storage medium recording the customer's name, account number, and optional personal identification number may be issued to each customer. Customer interface facilities 62 preferably employ data card readers 69 to obtain the information stored in the customer's deposit card and to immediately relay this information and the transaction amount to the customer's home prepay wireless platform 50. The transaction amount is then immediately posted to the customer's account to reflect the new balance. This transaction is similar to a credit card or debit card transaction at a point of sale (POS). If authorized, the customer may also dial a pre-assigned code with the wireless telephone to replenish his/her account with a credit card. Constructed in this manner, the customer may immediately begin to use the prepaid bundled telecommunications services.

Figure 3:
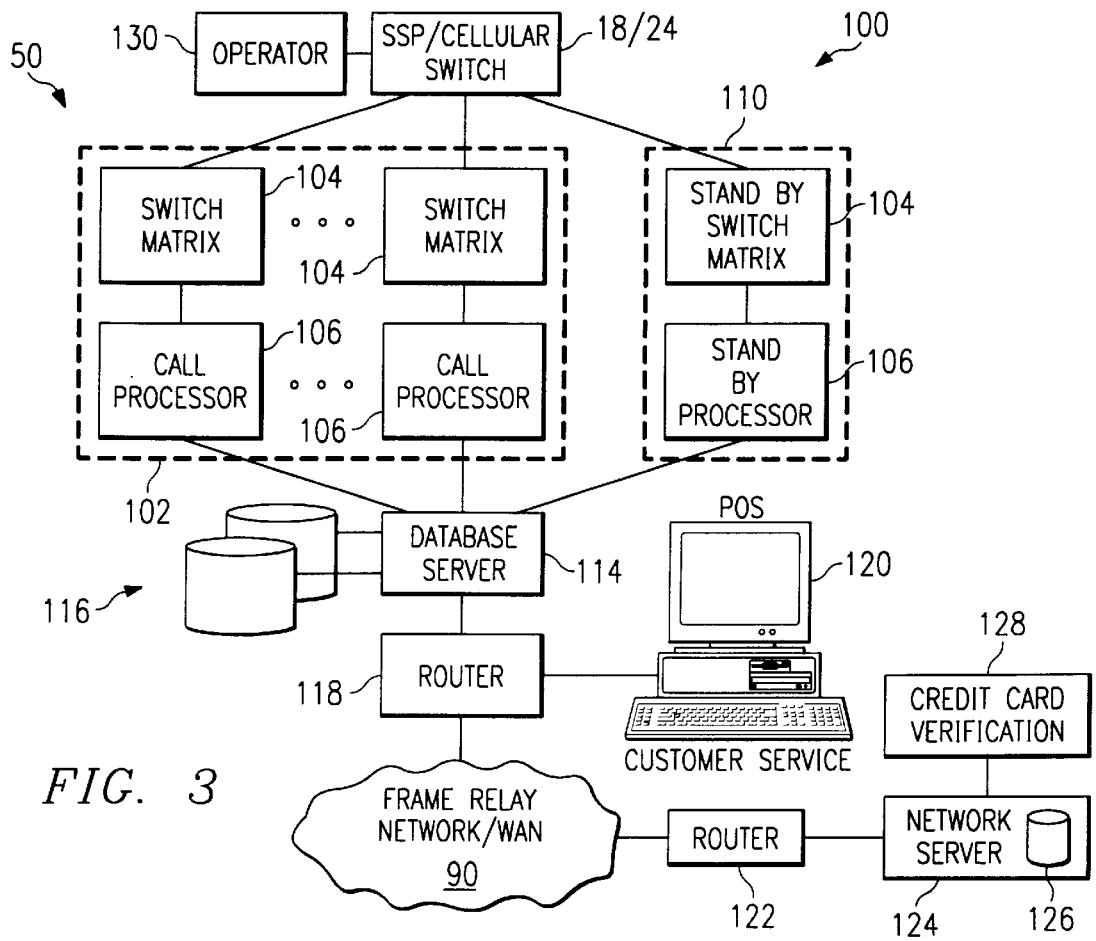
FIG. 3 is a block diagram of an exemplary prepay wireless platform according to the teachings of the present invention.

FIG. 3 is a block diagram of an exemplary prepay call management platform 50 according to the teachings of the present invention. Prepay call management platform 50 includes a primary call manager unit 102 and an optional backup call manager unit 110. Primary call manager unit 102 may include one or more switch matrices 104, each being coupled to a respective call processor 106. Call processors 106 provide voice prompts and announcements, account balance computations, call progress monitoring, and call blocking. Automatic voice announcements may be programmed to provide the customer the remaining balance in the prepay account at the beginning of a call and reminders to replenish accounts prior to call termination when a preset minimum is reached. If desired, multi-lingual voice announcements may be configured to meet the customer's preference.

Backup call manager 110 may be similarly constructed with one or more standby switch matrices 104 and a standby processor 106. The number of standby switch matrices and standby call processors is dependent on the level of redundancy required, which may be 1:1, 2:1, 3:1, etc. Switch matrices 104 may be implemented with Nortel™ Meridian™ switches and other switches of similar operational characteristics and functionality.

It may be seen that primary and standby call manager units 102 and 110 may be implemented by only a computing processor if prepay call management platform 50 is more highly integrated with the carrier's switch 24 or 18, so that the functionality of switch matrix 104 is carried out thereby. Primary and standby call manager units 102 and 110 are preferably co-located with SSP 18 or cellular switch 24 and are coupled thereto via a T1, SS7, or any other suitable link. In one embodiment, the functionality of switch matrices 104 are carried out by SSP 18 or cellular switch 24, so that the switch may be directly coupled to call processors 106. Call processors 106 are further coupled to a database server 114, which maintains a pair of mirrored databases 116 to provide redundancy and ensure the integrity of the data. Database server 114 and call processors 106 may be implemented by any processor unit with adequate processing capacity and speed, and may be a personal computer, a workstation, a mini-computer, or the like. Database server 114 is further coupled to a router 118 which provides data and message routing functions between prepay call management platform 50 and customer service/system administration/POS terminals 120 via a local area network (LAN), and to customer interface facilities 62 (FIG. 2) via a frame relay network or wide area network (WAN) 90.

Router 118 may further be coupled to a second router 122 via network 90. Router 122 is coupled to a server 124 via a communications link such as a local area network, and server 124 is further coupled to a processor 128 of a credit card verification company via an X.25 link, for example. An operator 130 may be coupled to cellular switch 24 for further processing when the caller requires assistance.

In operation, prepay call management platform 50 may accept dual-tone multifrequency (DTMF), multifrequency (MF), or primate rate addressing protocols from SSP 18 or cellular switch 24. Cellular switch 24 recognizes a prepay wireless call by the MIN, or more specifically, by the customer group office code (NPA-NXX). Prepay wireless customers may be assigned customer group office codes within a predetermined range for ease of recognition. When SSP 18 or cellular switch 24 recognizes a prepaid bundled telecommunications service account customer by the mobile identification number (MIN) or an account access number (an 1-800 number, for example), SSP 18 or cellular switch 24 transfers the call to prepay call management platform 50 for account balance verification, individual account processing requests, and then routes the call back to the carrier for call completion. However, if there is insufficient funds in the prepaid account, the call is not completed except certain calls such as those for emergency 911 or customer service. If a caller's account balance is exhausted while in the middle of a call, the call is disconnected immediately.

Because prepay call management platform 50 is directly coupled to the cellular carrier's switch 24 or SSP 18, and resides in close proximately or on-site therewith, calls may be monitored in real time to avoid unnecessary credit exposure. Further, customer data is readily accessible by the carrier's personnel via a LAN connection or a local dial-up protocol.

Figure 4A:
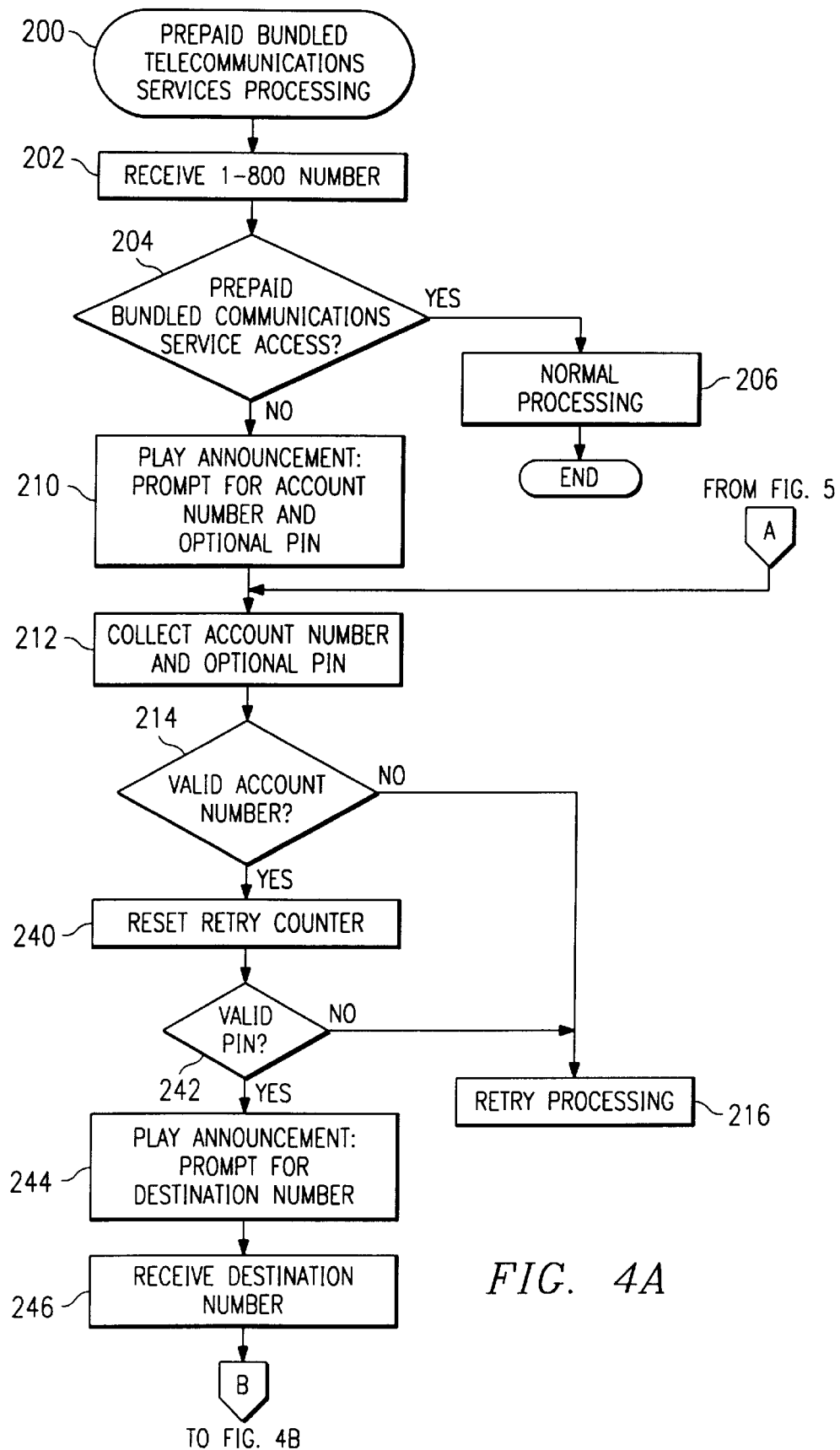
FIGS. 4A and B is a flowchart of an exemplary prepay bundled telecommunications account processing procedure according to an embodiment of the teachings of the present invention.

FIG. 4 is a flowchart of an exemplary prepaid bundled telecommunications services processing procedure 200 according to the teachings of the present invention. Referring also to FIG. 3, SSP 18 or cellular switch 24 receives an 1-800 call from a wired or wireless phone, as shown in block 202. This call, recognized by the particular 1-800 account access number, is transferred to prepay call management platform 50 for processing. Otherwise, normal processing is carried out by SSP 18 or cellular switch 24, as shown in block 206.

Upon receiving a call, the caller is prompted for an account number and an optional personal identification number (PIN), as shown in block 210. The account number may be a predetermined number of digits of the wireless telephone number assigned to the account holder. The PIN may be a predetermined number of digits of the account holder's social security number, such as the last four digits thereof, a number assigned by the carrier, or any number of the account holder's choosing. The account number and optional PIN are then collected and a database lookup of database 116 is performed to locate data related to the prepay customer. A determination is made as to whether the account number entered by the caller is valid, as shown in block 214. If the account number is not valid, then a retry processing procedure may be initiated, as shown in block 216.

Figures 4B, 5:
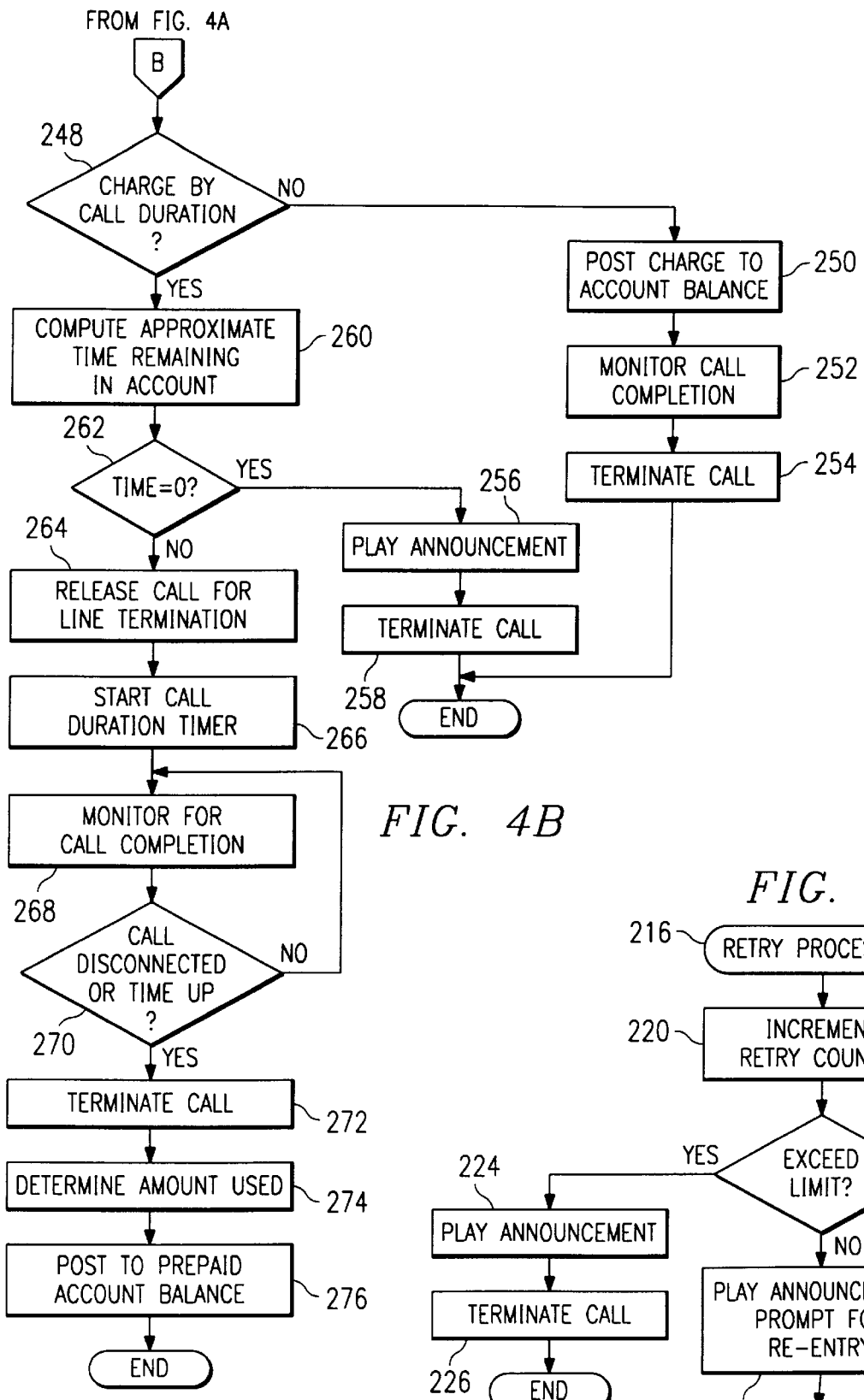
FIG. 5 is a flowchart of an exemplary account number and/or personal identification number re-entry process according to the teachings of the present invention.

Referring to FIG. 5, retry processing 216 may be implemented as follows. A retry counter is incremented, as shown in block 220. The counter is checked to determine if its count has reached or exceeded a predetermined threshold or limit, as shown in block 222. If the threshold has been reached, then an appropriate announcement is played to the caller to inform him/her that the entry of the account number is unsuccessful, and the call is terminated, as shown in blocks 224 and 226. Alternatively, the call may be routed to an operator for assistance. If the threshold was not reached in block 222, then an announcement informing the caller to re-enter the account number may be played, as shown in block 228. Execution then returns to block 212 of FIG. 4 to collect the account number digits. In general, the caller is allowed a predetermined number of tries to enter the correct account number to prevent fraudulent use of the account. A further counter may be employed to record the number of times the account is accessed over a predetermined period of time to detect excessive use.

Upon the successful entry of the account number, the retry counter may be reset, as shown in block 240, and the caller may be prompted for the PIN, and the PIN digits are then collected for validation. In this implementation, the same retry counter is used for both account number and PIN entry for simplicity. However, different retry processing routines using different counters and thresholds may be used for account number and PIN entry. Once the PIN is also successfully entered and validated, then the caller is prompted to enter the destination number, as shown in block 244. The caller dials the destination number for the number he/she desires to call, which may be a tolled number, long distance number, or a local number. The destination number may also be for a wireless or wired telephone. The destination number digits are received in block 246 and a determination is made in block 248 as to whether the call should be charged by duration of the call. Generally, a tolled call, long distance call, or a wireless call is charged by the call duration or by the minute; and a local call is charged by the call. If the call is such that charges associated therewith do not depend on the call duration, then the charges for the call are posted to the prepay account balance, as shown in block 250. The call is then connected and monitored for call completion, as shown in block 252. Upon call completion, the call is terminated in block 254 and execution ends.

If the call is charged based on call duration, then the rate per minute for the particular call is determined. Typically, the rate per minute for the call also includes applicable taxes, etc. From the rate per minute, the amount of time available for the call is computed based on the amount of funds available in the customer's account, as shown in block 260. This computed amount, in number of minutes, for example, is the maximum allowable call duration. If the time is zero, as determined in block 262, then a voice announcement is played by call processor 106 to inform the caller, and the call is disconnected, as shown in blocks 256 and 258. The process then terminates.

If, on the other hand, there are sufficient funds left in the account to connect the call, the call is released back to SSP 18 or cellular switch 24 for line termination, as shown in block 264. Once the call is released, call processor 106 starts a call duration timer, as shown in block 266. Call processor 106 further monitors the call for hardware answer supervision that indicates call completion, as shown in block 268. The call is torn down and disconnected when either of two conditions shown in block 270 becomes true:

1. The call is disconnected at the originating or terminating equipment; or
2. The call duration timer has reached the computed maximum allowable call duration.

As soon as one of the above conditions becomes true, the call is disconnected, as shown in block 272. The amount of funds expended by the call is then computed and immediately posted to the customer's account balance stored in databases 116, as shown in blocks 274 and 276. The process then terminates.

Constructed and operating in this manner, live call management is possible to protect prepay telecommunications carriers from fraud and calls made on depleted accounts. Further, complete records of all activation and replenishment transactions and details of each call are available to the prepaid bundled telecommunications service administration and the carriers, unlike systems which route prepay calls to remote switches for processing. Prepaid bundled telecommunications service account customers may activate or replenish their accounts at a comprehensive network of easily accessible locations, which relays the transaction amounts to the account balance databases in real-time. The same account number or card may be used for local calls, long distance calls, and tolled calls, from wired and wireless telephones. Therefore, the account customer only needs to maintain funds in one prepaid account for all of his/her telecommunications needs.

It may be seen that calls placed from the wireless telephone assigned to the account holder do not require the entry of account numbers and PINs, as account information is automatically conveyed by the mobile identification number (MIN) assigned to the wireless phone. However, another prepaid account customer has the flexibility to use that wireless phone to call the prepaid account access number to charge calls to his/her own prepaid account rather than the account associated with that particular wireless phone.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method for prepaid bundled telecommunications services, comprising the steps of:

recognizing a prepaid account access call at one of a plurality of service switching points, each service switching point coupled to a corresponding prepay call management platform;

routing the call over a link from the one service switching point to the corresponding prepay call management platform in response to recognizing the call at the one service switching point, the link directly coupling the corresponding prepay call management platform to the one service switching point;

collecting and validating an account number associated with a prepaid bundled telecommunications service account;

looking up an account balance associated with the prepaid bundled telecommunications service account;

collecting a destination number;

selecting a method of computing charges associated with terminating the call to the collected destination number;

verifying that sufficient funds are in the prepaid account to pay for the call;

routing the call to the one service switching point from the corresponding prepay call management platform for line termination;

monitoring the call for call completion; and posting the charges associated with the call to the prepaid account.

2. The method, as set forth in claim 1, wherein the step of selecting the method of computing charges comprises the steps of:

determining whether the charge is computed based on call duration;

determining a rate per minute for the call in response to the charge being computed based on call duration; and computing a maximum allowable call duration based on the prepaid account balance.

3. The method, as set forth in claim 2, further comprising the steps of:

starting a call duration timer;

monitoring the call for the call duration timer reaching the maximum allowable call duration; and disconnecting the call in response to the call duration timer reaching the maximum allowable call duration.

4. The method, as set forth in claim 2, wherein the step of selecting the method of computing charges comprises the step of determining the charge being computed based on call duration in response to the destination number being a long distance number.

5. The method, as set forth in claim 4, wherein the step of selecting the method of computing charges comprises the step of determining the charge being computed based on call duration in response to the destination number being a toll call number.

6. The method, as set forth in claim 2, wherein the step of selecting the method of computing charges comprises the step of determining the charge being computed based on call duration in response to the call being placed from a wireless telephone.

7. The method, as set forth in claim 1, wherein the method of computing charges selecting step comprises the step of determining a charge per call in response to the charge being computed on a per call basis.

8. The method, as set forth in claim 7, wherein the step of selecting the method of computing charges comprises the step of determining the charge being computed on a per call basis in response to the destination number being a local number.

9. The method, as set forth in claim 1, further comprising the step of collecting and validating a personal identification number associated with the prepaid bundled telecommunications service account.

10. The method, as set forth in claim 9, further comprising the step of playing an announcement prompting for the entry of the personal identification number.

11. The method, as set forth in claim 1, further comprising the step of playing an announcement prompting for the entry of the prepaid account number.

12. The method, as set forth in claim 1, further comprising the steps of:

incrementing a retry counter in response to the collected prepaid account number being invalid;

determining whether the retry counter reached a predetermined retry threshold; and disconnecting the call in response to the retry counter reaching the predetermined retry threshold.

13. The method, as set forth in claim 9, further comprising the steps of:

incrementing a retry counter in response to the collected personal identification number being invalid;

determining whether the retry counter reached a predetermined retry threshold; and disconnecting the call in response to the retry counter reaching the predetermined retry threshold.

14. The method, as set forth in claim 1, further comprising the step of immediately deducting the charges associated with the call from the prepaid account balance.

15. A method for bundling telecommunications services with a prepaid account, comprising the steps of:

recognizing a prepaid account access call at one of a plurality of cellular switches, each cellular switch coupled to a corresponding prepay call management platform;

routing the call over a link from the one cellular switch to the corresponding prepay call management platform in response to recognizing the call at the one cellular switch, the link directly coupling the corresponding prepay call management platform to the one cellular switch;

collecting and validating an account number associated with a prepaid account;

collecting a destination number;

looking up an account balance associated with the prepaid account;

selecting a method of computing charges associated with the call in response to whether the call is a local, long distance, or toll call;

verifying that sufficient funds are in the prepaid account to pay for the call;

routing the call to the one cellular switch from the corresponding prepay call management platform for line termination to the destination number;

monitoring the call for call completion;

determining the charges associated with the call; and posting the charges associated with the call to the prepaid account.

16. The method, as set forth in claim 15, wherein the step of selecting the method of computing charges comprises the steps of:

determining whether the charge is computed based on call duration;

determining a rate per minute for the call in response to the charge being computed based on call duration; and computing a maximum allowable call duration based on the prepaid account balance.

17. The method, as set forth in claim 16, further comprising the steps of:

starting a call duration timer;

monitoring the call for the call duration timer reaching the maximum allowable call duration; and disconnecting the call in response to the call duration timer reaching the maximum allowable call duration.

18. The method, as set forth in claim 16, wherein the step of selecting the method of computing charges comprises the step of determining the charge being computed based on call duration in response to the destination number being a long distance number.

19. The method, as set forth in claim 18, wherein the step of selecting the method of computing charges comprises the step of determining the charge being computed based on call duration in response to the destination number being a toll call number.

20. The method, as set forth in claim 16, wherein the step of selecting the method of computing charges comprises the step of determining the charge being computed based on call duration in response to the call being placed from a wireless telephone.

21. The method, as set forth in claim 15, wherein the method of computing charges selecting step comprises the step of determining a charge per call in response to the charge being computed on a per call basis.

22. The method, as set forth in claim 21, wherein the step of selecting the method of computing charges comprises the step of determining the charge being computed on a per call basis in response to the destination number being a local number.

23. The method, as set forth in claim 15, further comprising the step of collecting and validating a personal identification number associated with the prepaid bundled telecommunications service account.

24. The method, as set forth in claim 15, further comprising the steps of:

incrementing a retry counter in response to the collected prepaid account number being invalid;

determining whether the retry counter reached a predetermined retry threshold; and disconnecting the call in response to the retry counter reaching the predetermined retry threshold.

25. The method, as set forth in claim 23, further comprising the steps of:

incrementing a retry counter in response to the collected personal identification number being invalid;

determining whether the retry counter reached a predetermined retry threshold; and disconnecting the call in response to the retry counter reaching the predetermined retry threshold.

* * * * *